June 18, 1957  J. GONSKI  2,796,244
MATERIAL TRANSFER ARRANGEMENT FOR BORING TYPE MINING MACHINE
Filed April 30, 1956  2 Sheets-Sheet 1
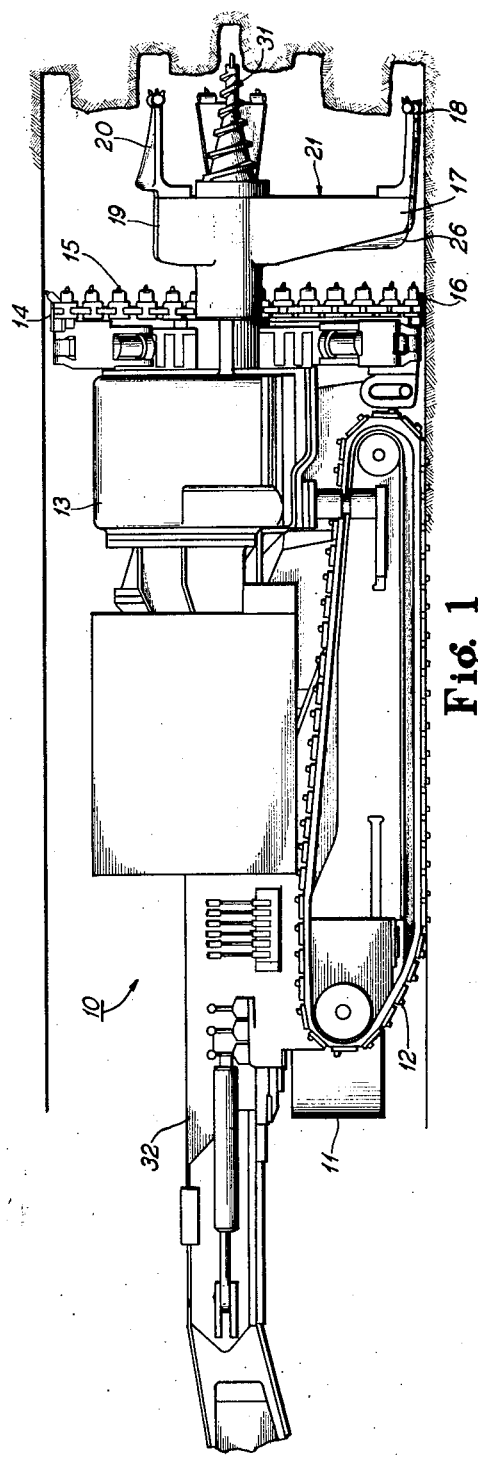
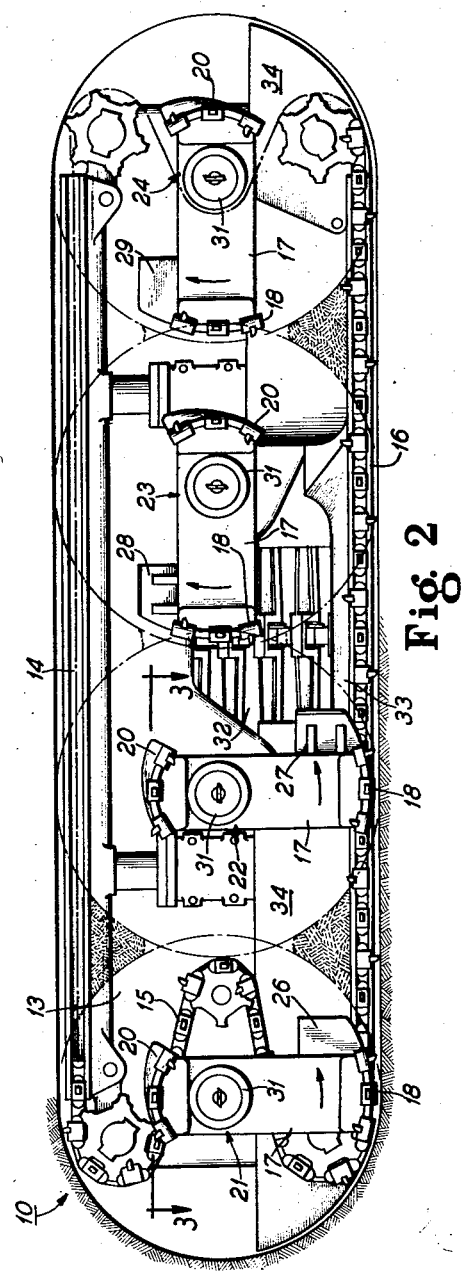
INVENTOR.
Joseph Gonski
BY
Murray A. Gleeson
ATTORNEY June 18, 1957　　　J. GONSKI　　　2,796,244
MATERIAL TRANSFER ARRANGEMENT FOR BORING TYPE MINING MACHINE
Filed April 30, 1956　　　2 Sheets-Sheet 2

INVENTOR.
Joseph Gonski

United States Patent Office 2,796,244
Patented June 18, 1957

2,796,244

MATERIAL TRANSFER ARRANGEMENT FOR BORING TYPE MINING MACHINE

Joseph Gonski, Chicago, Ill., assignor to Goodman Manufacturing Company, Chicago, Ill., a corporation of Illinois Application April 30, 1956, Serial No. 581,514

4 Claims. (Cl. 262—7)

This invention relates generally to improvements in boring type mining machines and more particularly to means for crowding broken and dislodged material into the conveyor throat of a machine having four or more boring heads in side-by-side relation.

It is customary in boring type mining machines to provide paddles or vanes on the arms of the boring head to crowd loose material in the vicinity of a boring head toward the conveyor throat so that the loose material can be carried away from the working place. Present machines are arranged to crowd the loose material inwardly in the plane of rotation of the boring heads or inwardly and rearwardly toward the conveyor throat. In machines where there is only one boring head on each side of a conveyor throat, the inward and rearward crowding of the loose material is advantageous inasmuch as rearward travel helps the material onto the conveyor. However, where an additional boring head is located farther out from the conveyor throat, as in four-headed boring miners, a rearward motion imparted to the loose material by the outer heads tends to pack the material behind the outer head against the machine frame, thereby impeding movement of the loose material toward the conveyor inlet. To a lesser degree, similar packing occurs where the loose material is crowded directly inward toward the conveyor throat as a result of the forward movement of the machine.

Therefore, it is a principal object of the present invention to provide, in a machine having more than one head at the same side of the conveyor throat, means for crowding loose material, in the vicinity of an outer head, inwardly and forwardly into the path of an inner head, by which the material is then crowded inwardly and rearwardly toward the conveyor throat.

The invention may be more fully understood by reference to the drawings, in which—

Figure 1 is a side elevation view of a boring type mining machine made in accordance with the present invention;

Figure 2 is a front view of the machine shown in Figure 1; and

Figure 3:
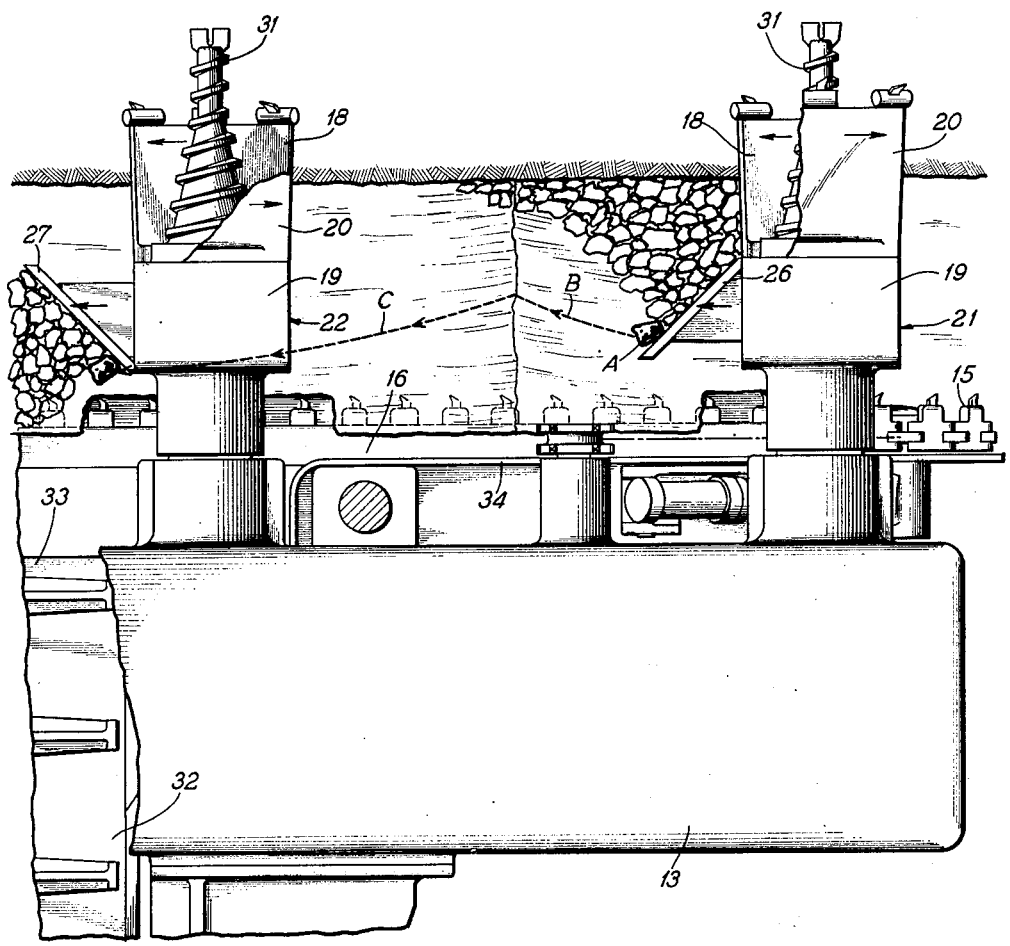
Figure 3 is a fragmentary top view, in part plan and in part section taken on line 3—3 of Figure 2, showing portions of the conveyor, sub-frame, boring heads, cutter chain, and deflectors.

Referring now more particularly to the drawings, the numeral 10 designates generally a boring type mining machine having a frame 11 mounted for movement along a mine floor or the like on crawler treads 12. Mounted upon frame 11 is a centrally disposed conveyor generally designated at 32 and an auxiliary frame 13, both being adjustably mounted on the frame 11 as usual by means of hydraulic cylinders. The auxiliary frame 13 has mounted thereon four boring heads 21, 22, 23 and 24 disposed in side-by-side, partially overlapping relation. Upper and lower cutter bars 14 and 16 along which a cutter chain 15 is guided, are also mounted, as usual, on the auxiliary frame 13, to trim the upstanding and depending cusps left between adjacent boring heads, after their bores are formed.

Each of the cutter heads has a relatively long radial arm 17 with a forwardly projecting cutter support 18 at its outer end for cutting an outer circular kerf in the working face, a relatively short arm 19 with a cutter support 20 for cutting an inner circular kerf, and an axially disposed pilot drill 31 of a conventional type. The two heads 21 and 22 at the left side of the machine, as seen in Figure 2, are driven to rotate in counterclockwise direction, and the two heads 23 and 24 on the right side of the machine rotate in clockwise direction, as indicated by the arrows.

The outer heads 21 and 24 have forwardly facing, inclined blades or paddles 26 and 29 mounted on the leading sides of their long arms 17 adjacent the ends thereof, and spaced rearwardly of the front ends of the adjacent cutter supports 18. The inner heads 22 and 23 have similarly disposed, but rearwardly facing inclined blades 27 and 28 on their arms 17.

Mounted along the lower cutter bar 16 at opposite sides of the throat 33 of conveyor 32 and behind the heads 21, 22, 23 and 24 are upright shields or baffle plates 34 arranged to prevent broken material from traveling directly rearwardly into the various parts of the machine.

The use and operation is as follows: The machine is advanced as usual into a face of coal or the like with its several boring heads rotating to cut and dislodge the material from the working face. The broken and dislodged material falls to the floor, which at this point is defined by a row of arcuate depressions resulting from the boring action of the several boring heads. During each rotation of the heads, the longer arms 17 of the inner heads 22 and 23 must plow through the broken and dislodged material at the bottom of their respective bores. The deflector blades or paddles 27 and 28 on these inner heads are arranged to push or crowd the broken material inward toward the conveyor throat 33. The blades 26 and 29 on the outer heads 21 and 24, respectively, face at a forwardly inclined angle to push the broken material laterally along the bottoms of their respective bores, and inwardly and forwardly toward the paths of blades 27 and 28, respectively, of the inner heads 22 and 23. The blades 27 and 28 then push the broken material inwardly and rearwardly toward the conveyor throat 33 during the succeeding revolutions of their respective blades.

The action of blade 26 of outer head 21 in moving or crowding the broken material toward the adjacent inner head 22 is illustrated diagrammatically in Figure 3, wherein a lump A of loose material will tend to be crowded forwardly and inwardly substantially along dotted line B until it reaches a position where it will be engaged by blade 27 on the adjacent inner head 22. The lump A is then crowded inwardly and rearwardly by the blade 27 substantially along dotted line C into loading position in front of the conveyor throat 33.

The forwardly inclined blades 26 and 29 of the outer heads 21 and 24 thereby prevent the adjacent loose material from packing against the adjacent shield 34 on the frame, thereby decreasing friction against said shield which otherwise would tend to impede the free flow of the loose material toward the inner heads 22 and 24. In other words, these forwardly facing blades 26 and 29 tend to move the loose material forwardly and inwardly along the floor and toward the adjacent inner heads while keeping the material loosely broken up. Since the blade on each inner head is rotated in the same direction as the blade on the adjacent outer head, the material is swept rearwardly and inwardly in a path adjacent the floor in a substantially continuous stream toward the conveyor throat.

Although I have shown and described a certain embodiment of my invention, it will be understood that various changes and modifications may be made without departing from the spirit and scope of the invention as defined by the appended claims.

I claim:

1. In a boring type mining machine having a mobile frame, a longitudinal conveyor mounted on said frame having a forwardly opening throat adjacent the floor level, a plurality of boring heads rotatably mounted on spaced parallel axes on the frame in side-by-side relation to cut contiguous bores in advance of said machine, two of said heads being disposed adjacent each other toward the same side of said conveyor throat, each of said heads including a radial arm having a forwardly projecting cutter support carried thereon, means for sweeping the broken and dislodged material toward said conveyor throat comprising blades mounted adjacent the outer ends of the radial arms of each of said heads, the blade mounted on the arm of said outer head being inclined forwardly relative to its direction of rotation and the blade on the arm of the inner head being inclined rearwardly relative to its direction of rotation.

2. The structure of claim 1, wherein the blades are spaced rearwardly of the front ends of the adjacent cutter supports on their respective arms.

3. The structure of claim 1, wherein the two heads disposed to the same side of the conveyor throat are both rotated in the same direction to sweep loose material in a path adjacent the floor toward the conveyor throat.

4. In a boring type mining machine having a frame; a conveyor, having a throat, mounted on said frame; a plurality of heads, including an inner head and an outer head rotatable inwardly at floor level on spaced parallel axes at one side of said conveyor throat, and mounted on said frame; each head comprising a radial arm having mounted thereon cutting elements, and sweeping means for sweeping the broken and dislodged material toward said conveyor throat; each of said sweeping means comprising a paddle angularly disposed with respect to the plane of rotation of the arm on which it is mounted and disposed near the radial extremity of said arm; the paddle mounted on the arm of said outer head being canted to crowd material in a forward and inward direction toward said inner head, and the paddle on the arm of the inner head being canted to crowd material rearwardly and inwardly toward said conveyor throat.

References Cited in the file of this patent
UNITED STATES PATENTS 2,706,624     Bowman _____ Apr. 19, 1955